(12) United States Patent
Komiyama et al.

(10) Patent No.: US 11,107,301 B2
(45) Date of Patent: Aug. 31, 2021

(54) OPERATION MANAGEMENT SYSTEM AND METHOD FOR DISCLOSING OPERATIONAL INFORMATION

(71) Applicant: KOBELCO CONSTRUCTION MACHINERY CO., LTD., Hiroshima (JP)

(72) Inventors: Masayuki Komiyama, Hiroshima (JP); Yoichiro Yamazaki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 177 days.

(21) Appl. No.: 16/328,923

(22) PCT Filed: Aug. 1, 2017

(86) PCT No.: PCT/JP2017/027806
§ 371 (c)(1),
(2) Date: Feb. 27, 2019

(87) PCT Pub. No.: WO2018/051660
PCT Pub. Date: Mar. 22, 2018

(65) Prior Publication Data
US 2019/0251760 A1     Aug. 15, 2019

(30) Foreign Application Priority Data

Sep. 15, 2016 (JP) .............................. JP2016-180283

(51) Int. Cl.
*G07C 5/08*     (2006.01)
*G06Q 50/08*    (2012.01)
(Continued)

(52) U.S. Cl.
CPC ............ *G07C 5/008* (2013.01); *E02F 9/2054* (2013.01); *G06Q 50/08* (2013.01); *G07C 5/085* (2013.01); *H04L 63/101* (2013.01)

(58) Field of Classification Search
CPC ........ G07C 5/008; G07C 5/085; G06Q 50/08; E02F 9/2054; H04L 63/101
See application file for complete search history.

(56) References Cited

U.S. PATENT DOCUMENTS 7,756,736 B2     7/2010   Nakayama et al.
2005/0002354 A1* 1/2005   Kelly ....................... H04L 45/04
                                                   370/329

(Continued)

FOREIGN PATENT DOCUMENTS

JP     9-78831 A      3/1997
JP     2001-202426 A  7/2001

(Continued)

OTHER PUBLICATIONS

International Search Report dated Oct. 17, 2017 in PCT/JP2017/027806 filed on Aug. 1, 2017.

(Continued)

*Primary Examiner* — Tyler J Lee
(74) *Attorney, Agent, or Firm* — Oblon, McClelland, Maier & Neustadt, L.L.P.

(57) ABSTRACT

A reception unit receives, from an execution information terminal, an access request made by an execution manager to an operation management system. When the reception unit receives the access request, a determination unit determines whether the execution manager who has made the access request satisfies a disclosure condition stored in a first storage unit. When the determination unit determines that the execution manager who has made the access request satisfies the disclosure condition, a permission unit permits (Continued)

disclosure of the operational information to the execution manager.

4 Claims, 5 Drawing Sheets

(51) Int. Cl.
*E02F 9/20* (2006.01)
*G07C 5/00* (2006.01)
*H04L 29/06* (2006.01)

(56) References Cited

U.S. PATENT DOCUMENTS

| | | | | |
|---|---|---|---|---|
| 2005/0005167 | A1* | 1/2005 | Kelly | H04L 41/28 726/4 |
| 2007/0067582 | A1* | 3/2007 | Kakizawa | G07C 5/085 711/154 |
| 2007/0101017 | A1* | 5/2007 | Dawson | H04L 67/125 709/238 |
| 2007/0124000 | A1* | 5/2007 | Moughler | G05B 19/0426 705/301 |
| 2007/0142928 | A1* | 6/2007 | Moughler | G05B 23/0283 700/12 |
| 2007/0142940 | A1* | 6/2007 | Ferguson | G05B 23/0216 700/83 |
| 2013/0030873 | A1* | 1/2013 | Davidson | H04W 4/021 705/7.36 |
| 2015/0163212 | A1 | 6/2015 | Saegusa | |
| 2016/0343231 | A1* | 11/2016 | Bump | B01F 15/00311 |
| 2017/0123397 | A1* | 5/2017 | Billi | G06Q 10/063 |

FOREIGN PATENT DOCUMENTS

| | | |
|---|---|---|
| JP | 2003-186982 A | 7/2003 |
| JP | 2004-318452 A | 11/2004 |
| JP | 2008-108107 A | 5/2008 |
| JP | 2010-231411 A | 10/2010 |
| JP | 2010-287071 A | 12/2010 |
| JP | 2014-52679 A | 3/2014 |
| JP | 2015-22697 A | 2/2015 |
| JP | 2016-76123 A | 5/2016 |

OTHER PUBLICATIONS

Extended European Search Report dated Jun. 24, 2019 in Patent Application No. 17850566.5, 8 pages
Japanese Office Action dated Sep. 15, 2020 in Patent Application No. 2016-180283 (with English translation), 11 pages.

* cited by examiner

| USER ID | PASSWORD | DISCLOSURE CONDITION | DISCLOSURE ITEM |
|---|---|---|---|
| AA | xxxxx | POSITIONAL CONDITION | OPERATIONAL INFORMATION 1, 2 |
| BB | yyyyy | PERIOD CONDITION | OPERATIONAL INFORMATION 3 |
| CC | zzzzz | POSITIONAL CONDITION, PERIOD CONDITION | ALL |
| ... | ... | ... | ... |

| USER ID | WORK MACHINE ID | USE PERIOD | WORK SITE |
|---|---|---|---|
| AA | K11<br>K12 | 2016/3/1 – 2016/6/30 | (LATITUDE X01, LONGITUDE Y01) –<br>(LATITUDE X02, LONGITUDE Y02) |
| BB | K23<br>K24 | 2016/5/1 – 2016/8/30 | (LATITUDE X12, LONGITUDE Y11) –<br>(LATITUDE X12, LONGITUDE Y12) |
| ... | ... | ... | ... |

| WORK MACHINE ID | OPERATIONAL INFORMATION 1 | OPERATIONAL INFORMATION 2 | OPERATIONAL INFORMATION 3 | OPERATIONAL INFORMATION 4 | OPERATIONAL INFORMATION 5 |
|---|---|---|---|---|---|
| K11 | aa1(2016/3/1/13:00)<br>aa2(2016/3/1/14:00)<br>... | ... | ... | ... | ... |
| K12 | ... | ... | ... | ... | ... |
| K23 | ... | ... | ... | ... | ... |
| K24 | ... | ... | ... | ... | ... |
| ... | ... | ... | ... | ... | ... | ved

OPERATION MANAGEMENT SYSTEM AND METHOD FOR DISCLOSING OPERATIONAL INFORMATION

CROSS REFERENCE TO RELATED APPLICATION

This application is a national phase application of PCT/JP2017/027806, filed Aug. 1, 2017, which claims priority to Japanese Patent Application No. 2016-180283, filed Sep. 15, 2016, the entire content and disclosure of each of which is incorporated into the present application.

TECHNICAL FIELD

The present disclosure relates to a technique for disclosing operational information in an operation management system that manages the operational information.

BACKGROUND ART

In recent years, in a field of work machines such as construction machines, operation management systems that manage operational information on work machines, such as fuel efficiency and positional information, have been used for owners of the work machines. In addition, execution management systems that manage execution information including an execution history of work machines have also been used for execution managers who rent work machines from owners. Some execution managers desire to acquire operational information in addition to execution information to cause work machines to work efficiently. Therefore, causing the operation management system and the execution management system to work in a coordinated manner and providing the execution managers with the operation history have been studied.

As a technique to cause the operation management system and the execution management system to work in a coordinated manner, Patent Literature 1 is cited. Patent Literature 1 discloses a work machine remote control system that acquires, from a work machine, vehicle information and positional information on a work machine and provides a terminal device with the acquired information. In this work machine remote control system, a rental system that manages rental customer information on the work machine and vehicle information on the work machine is connected via a network. Then, based on the vehicle information and the positional information obtained from the work machine, and the vehicle information and the rental customer information obtained from the rental system, the work machine remote control system generates an image showing on a map a site position of a borrower of the work machine and the vehicle information on the work machine, and provides a terminal device with the image.

However, Patent Literature 1 is directed to an invention of providing the terminal device of the work machine remote control system with the information obtained from the rental system, and is not directed to an invention of providing the rental system with the information obtained from the work machine remote control system. Therefore, Patent Literature 1 cannot provide the rental system with the operational information.

It is preferable to provide the execution manager with the operational information because the execution manager can be provided with materials for determining work efficiency and the like in a work site.

However, since a work machine is sequentially rented to a plurality of execution managers, if the execution manager whose rental period has ended is permanently provided with operational information, the execution manager whose rental period has ended is provided with the operational information of the execution manager who currently rents the work machine, causing a security issue.

CITATION LIST

Patent Literature

Patent Literature 1: JP 2008-108107 A

SUMMARY OF INVENTION

An object of the present invention is to provide an operation management system that provides an execution manager with operational information while ensuring security.

One aspect of the present invention is an operation management system for managing one or more types of operational information on a work machine, the operation management system being connected via a network to an information management system that manages information to be provided to one or more execution managers who manage work in a work site of the work machine, the information being different from the operational information, the operation management system including: a storage unit configured to store a disclosure condition of each of the execution managers, the disclosure condition being set by a manager of the operation management system for permitting disclosure of the operational information; a reception unit configured to receive, from a terminal of the information management system, an access request made by the execution manager to the operation management system; a determination unit configured to determine, when the reception unit receives the access request, whether the execution manager who has made the access request satisfies the corresponding disclosure condition; and a permission unit configured to permit the disclosure of the operational information to the execution manager when the determination unit determines that the corresponding disclosure condition is satisfied.

The present invention allows the execution manager to be provided with the operational information while ensuring security.

BRIEF DESCRIPTION OF DRAWINGS

FIG. 2 is a diagram showing one example of a disclosure condition table.

FIG. 3 is a table showing one example of a management table.

FIG. 4 is a diagram showing one example of an operational information table.

DESCRIPTION OF EMBODIMENT

Figure 1:
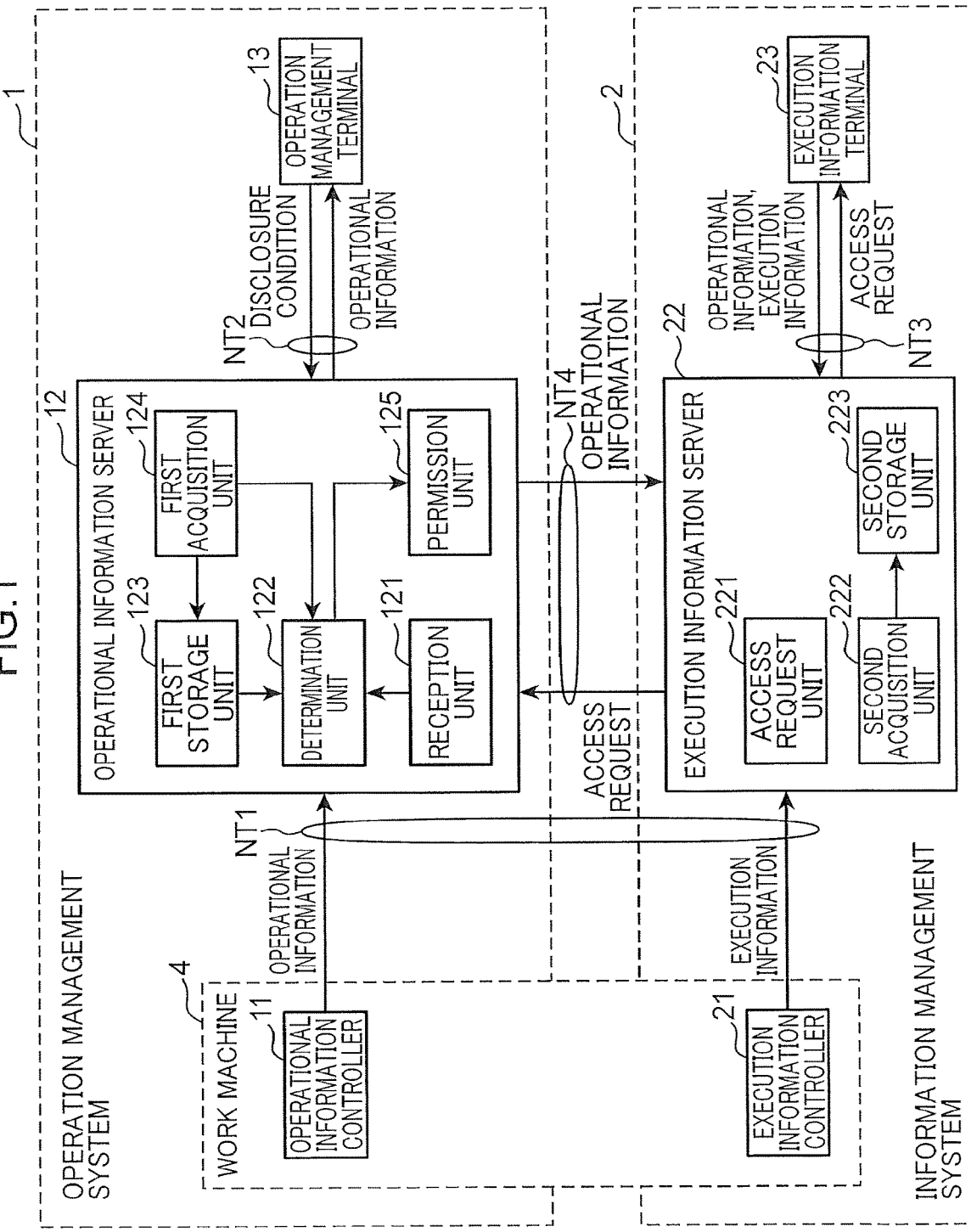
FIG. 1 is a diagram showing a configuration of an operation management system according to an embodiment of the present invention.

FIG. 1 is a diagram showing a configuration of an operation management system 1 according to an embodiment of the present invention. The operation management system 1 is communicatively connected to an information management system 2 via a network NT4, and manages one or more types of operational information on one or more work machines. The operation management system 1 is, for example, a system to be used by an owner of a work machine 4, collects the operational information from an operational information controller 11, and provides the owner with the operational information. Hereinafter, the owner of the work machine 4 is referred to as "operation manager." The work machine 4 is, for example, a construction machine such as a shovel car, a crane, and a dump truck. FIG. 1 shows only one work machine 4 for convenience of description, but there may be one or more work machines 4.

The information management system 2 is a system that manages execution information to be provided to one or more execution managers. The execution manager is a person who manages work in a work site of the work machine 4, and for example, corresponds to an execution company that performs execution work in the work site by using the work machine 4 rented from the operation manager.

The operational information is information indicating an operating status of the work machine 4, and includes, for example, positional information, fuel efficiency information, alarm information, operation time, and idling time.

The positional information is information indicating a current position of the work machine 4 in actual space. The fuel efficiency information is information indicating fuel efficiency of an engine of the work machine 4. The fuel efficiency information may be current fuel efficiency, or may be an average of fuel efficiency per unit time.

The alarm information is information indicating that the work machine 4 has raised an alarm. The alarm is raised when the work machine 4 enters a dangerous state, for example, when the work machine 4 is likely to interfere with an obstacle.

The operation time indicates, for example, time when the engine is turned on, or time when the work machine 4 actually performs work while the engine is turned on.

The idling time indicates time when the engine of the work machine 4 operates in an idling state. The idling state corresponds to a state where the engine is turned on and the work machine 4 is at no-load (where the work machine 4 is doing no work). The idling information may be idling time for individual idling state, an average of idling time per unit time, or an integrated value of idling time in one day.

The execution information is information to be used by the execution manager in order to determine whether the work machine 4 is doing work according to an execution plan determined in advance. For example, the execution information corresponds to an execution history.

The operation management system 1 includes the operational information controller 11, an operational information server 12, and an operation management terminal 13.

The operational information controller 11 is installed in the work machine 4, and is connected to the operational information server 12 via a network NT1. The operational information controller 11 is configured as, for example, a computer including components such as a CPU and a ROM, collects the operational information on the work machine 4, and transmits the operational information to the operational information server 12.

The operational information controller 11 may acquire, for example, the positional information on the work machine 4 from a GPS sensor included in the work machine 4. The operational information controller 11 may acquire, for example, fuel efficiency information, alarm information, operation time, and idling time of the work machine from a main controller (not shown) of the work machine 4.

The operational information controller 11 may transmit the operational information at regular time intervals, and may transmit the operational information when there is an acquisition request for the operational information from the operational information server 12. Also, when the work machine 4 is configured to be always operative regardless of whether the engine is on or off, the operational information controller 11 may transmit the operational information in a period when the engine of the work machine 4 is turned off.

The operational information server 12 is configured as a computer including components such as a CPU, a ROM, and a communication device, and has functions of a reception unit 121, a determination unit 122, a first storage unit 123, a first acquisition unit 124, and a permission unit 125. These functions are implemented by the CPU of the operational information server 12 executing a computer-readable program.

The reception unit 121 receives, from an execution information terminal 23, an access request made by the execution manager to the operation management system 1. Here, the access request transmitted from the execution information terminal 23 is transmitted to the operational information server 12 via an execution information server 22. The access request is data for the execution manager to acquire the operational information from the operation management system 1.

The access request includes a user ID and a password of the execution manager. The user ID and the password of the execution manager are used for the execution manager to access the operational information server 12 and the execution information server 22 by using the execution information terminal 23. The user ID is a symbol string uniquely provided to one or more execution managers.

When the reception unit 121 receives the access request, the determination unit 122 determines whether the execution manager who has made the access request satisfies a disclosure condition stored in the first storage unit 123. FIG. 2 is a diagram showing one example of a disclosure condition table T1 in which the disclosure condition is registered.

The disclosure condition table T1 includes one or more records in which one record is assigned to one execution manager. Each record is provided with fields for "user ID", "password", "disclosure condition", and "disclosure item."

The user ID of the execution manager is registered in the field of "user ID." The password of the execution manager is registered in the field of "password." Conditions the execution manager should satisfy in order to obtain permission of disclosure of the operational information are registered in the field of "disclosure condition." The disclosure condition includes at least one of a positional condition and a period condition. The positional condition is area information on the work site where the execution manager performs the execution work in actual space. The period condition is a use period in which the execution manager is permitted to use the work machine.

For example, when the execution manager with the user ID "AA" satisfies the positional condition, it is determined that the execution manager satisfies the disclosure condition, because only "the positional condition" is registered in the field of "disclosure condition." When the execution manager with the user ID "BB" satisfies the period condition, it is determined that the execution manager satisfies the disclosure condition, because only "the period condition" is registered in the field of "disclosure condition." When the execution manager with the user ID "AA" satisfies two conditions, the positional condition and the period condition, it is determined that the execution manager satisfies the disclosure condition, because only "the positional condition" and "the period condition" are registered in the field of "disclosure condition."

In more detail, the determination unit 122 determines whether the execution manager satisfies the disclosure condition and the period condition by using a management table T2 shown in FIG. 3. FIG. 3 is a table showing one example of the management table T2. The management table T2 is a table in which information for the operation management system 1 to manage the execution manager is registered. The management table T2 includes one or more records in which one record is assigned to one execution manager. Each record is provided with fields for "user ID", "work machine ID", "use period", and "work site."

"The user ID" is the same as "the user ID" of FIG. 2. An identifier of the work machine 4 the operation manager rents to the execution manager is registered in the field of "work machine ID." Here, the work machine ID is an identifier uniquely assigned in order to distinguish one or more work machines 4 the operation manager owns.

For example, since the execution manager of the user ID "AA" rents the work machines with the work machine IDs "K11" and "K12", "K11" and "K12" are registered in the field of "work machine ID."

The use period (rental period) of the work machine 4 the operation manager rents to the execution manager is registered in the field of "use period." Here, "year/month/day" indicating the first day and all day of the use period is registered. For example, since the execution manager of the user ID "AA" is permitted to use the work machines 4 from Mar. 1, 2016 to Jun. 30, 2016, "2016 Mar. 1-2016 Jun. 30" is registered in the field of "use period."

Area information of the work site in actual space where the execution manager performs execution work by using the rented work machines 4 is registered in the field of "work site." Here, it is considered that a shape of the work site is a rectangle, and latitude and longitude of an upper left vertex of the rectangle and latitude and longitude of a lower right vertex of the rectangle are registered. Therefore, the area of the work site is indicated with this rectangle. Note that it is one example to represent the positional information on the work site with a rectangle, and information indicating an actual shape of the work site may be employed as the area information.

Next, with reference to FIG. 3, one example of processing of the determination unit 122 is shown. Suppose that the execution manager with the user ID "AA" makes an access request. In this case, the determination unit 122 determines that the execution manager satisfies the positional condition, when the latest positional information on each of the work machines 4 with the work machine IDs "K11" and "K12" acquired by the first acquisition unit 124 is positioned within the area of the work site indicated by "(latitude X01, longitude Y01)-(latitude X02, longitude Y02)" registered in the field of "work site."

Suppose that the execution manager with the user ID "BB" makes an access request. In this case, the determination unit 122 determines that this execution manager satisfies the period condition, when acquisition time of the access request acquired by the first acquisition unit 124 is within a period of "2016 Mar. 1-2016 Jun. 30" registered in the field of "use period."

Reference is returned to FIG. 1. The first storage unit 123 stores the disclosure condition table T1 shown in FIG. 2, the management table T2 shown in FIG. 3, and an operational information table T3 shown in FIG. 4.

The first acquisition unit 124 acquires, from the operation management terminal 13, the disclosure condition of each execution manager for permitting disclosure of the operational information, the disclosure condition being set by the operation manager by using the operation management terminal 13. The first acquisition unit 124 then registers the disclosure condition in the disclosure condition table T1. Also, the first acquisition unit 124 acquires the operational information transmitted from the operational information controller 11, and registers the operational information in the operational information table T3 of the first storage unit 123.

FIG. 4 is a diagram showing one example of the operational information table T3. The operational information table T3 includes one or more records in which one record is assigned to one work machine, and each record includes fields of "work machine ID" and operational information "1"-"operational information "5.""

"The work machine ID" is the same as "the work machine ID" of FIG. 3. The operational information classified by type is registered in the fields of the operational information "1"-the operational information "5." The above-described positional information, the fuel efficiency information, the alarm information, the idling time, and the like correspond to the type of operational information.

For example, for the work machine 4 with the work machine ID "K11", the operational information "1" of "aa1" is acquired at 13:00 on Mar. 1, 2016, and the operational information "1" of "aa2" is acquired at 14:00 on Mar. 1, 2016. Therefore, a value of the operational information "1" is registered in the field of the operational information "1" of the work machine ID "K11" in association with the acquisition time, such as "aa1 (2016 Jan. 13/13:00)" and "aa2 (2016 Jan. 13/14:00)." In a similar manner to this field, the value of the operational information is registered in other fields in association with the acquisition time. In this way, a history of the operational information for each work machine 4 is accumulated in the operational information table T3.

When the determination unit 122 determines that the execution manager who has made the access request satisfies the disclosure condition, the permission unit 125 permits disclosure of the operational information to the execution manager. Here, the type of operational information that is permitted to be disclosed to the execution manager is registered in the field of "disclosure item" of the disclosure condition table T1. Therefore, with reference to the field of "disclosure item" of the disclosure condition table T1, the permission unit 125 determines the type of operational information that is permitted to be disclosed to the execution manager, and discloses only the permitted type of operational information to the execution manager.

For example, with reference to FIG. 2, disclosure of the operational information "1" and the operational information "2" is permitted to the execution manager with the user ID "AA." Also, the work machines 4 with the work machine ID "K11" and the work machine ID "K12" are associated with this execution manager (refer to FIG. 3). Therefore, out of the operational information registered in the operational information table T3, the permission unit 125 permits disclosure of only the operational information "1" and "2" on the work machine IDs "K11" and "K12" to the execution manager with the user ID "AA."

In more detail, the permission unit 125 may disclose the operational information by reading from the operational information table T3 and transmitting only the operational information "1" and the operational information "2" on the work machine IDs "K11" and "K12" to the corresponding execution information terminal 23. Note that the operational information transmitted from the permission unit 125 is transmitted to the corresponding execution information terminal 23 via the execution information server 22.

Reference is returned to FIG. 1. The operation management terminal 13 is configured as a computer including a CPU, a ROM, an input device, a display device, and a communication device. The operation management terminal 13 is connected to the operational information server 12 via a network NT2. The operation management terminal 13 receives input of the disclosure condition set by the operation manager, and transmits the received disclosure condition to the operational information server 12. The operation management terminal 13 transmits the acquisition request for acquiring the operational information to the operational information server 12 in response to an instruction from the operation manager. The operation management terminal 13 then receives the operational information. Note that the operational information server 12 transmits the operational information to the operation management terminal 13, without particularly restricting disclosure.

The information management system 2 includes an execution information controller 21, the execution information server 22, and the execution information terminal 23.

The execution information controller 21 is installed in the work machine 4, and is connected to the execution information server 22 via the network NT1. The execution information controller 21 is configured as, for example, a computer including components such as a CPU and a ROM, collects the execution information on the work machine 4, and transmits the execution information to the execution information server 22.

The execution information controller 21 may transmit the execution information at regular time intervals, and may transmit the execution information when there is an acquisition request for the execution information from the execution information controller 21. Also, when the work machine 4 is configured to be always operative regardless of whether the engine is on or off, the execution information controller 21 may transmit the execution information in a period when the engine of the work machine 4 is turned off.

When the work machine 4 is configured as a shovel car including a boom, an arm, a bucket and the like, the execution information controller 21 calculates, for example, information on a locus of a bucket tip, shape data of the execution site after execution work, and the like from information detected with a distance measurement sensor and an angle sensor included in the work machine 4. The execution information controller 21 then transmits the information to the execution information server 22 as the execution information.

Also, the execution information controller 21 stores execution plan information including target topographical data of the work site after ground leveling. The execution information controller 21 provides work guidance to an operator of the work machine 4 such that current topographical data of the work site becomes target topographical data.

The execution information server 22 is configured as a computer including components such as a CPU, a ROM, and a communication device, and has functions of an access request unit 221, a second acquisition unit 222, and a second storage unit 223. These functions are implemented by the CPU of the execution information server 22 executing a computer-readable program.

When the access request unit 221 receives the access request for acquiring the operational information from the execution information terminal 23, the access request unit 221 transfers the access request to the operational information server 12.

The second acquisition unit 222 acquires the execution information transmitted from the execution information controller 21, and registers the execution information in the execution information table of the second storage unit 223 (not shown). The execution information table has data structure similar to data structure of the operational information table T3, and the execution information on each work machine 4 is registered in association with acquisition time of the execution information. The second storage unit 223 stores the execution information table (not shown).

The execution information terminal 23 is configured as a computer including a CPU, a ROM, an input device, a display device, and a communication device. The execution information terminal 23 is connected to the execution information server 22 via a network NT3. The execution information terminal 23 transmits the acquisition request for acquiring the execution information to the execution information server 22 in response to an instruction from the execution manager. The execution information terminal 23 then receives the execution information and displays the execution information on the display device. This allows the execution manager to read the execution information.

When the execution manager inputs the instruction of access request to the operation management system 1, the execution information terminal 23 transmits the access request to the execution information server 22.

When the operation management system 1 permits disclosure of the operational information, the execution information terminal 23 receives the operational information with disclosure permitted, and displays the operational information on the display device. This allows the execution manager to read the operational information with disclosure permitted.

The network NT1 is, for example, a satellite communication network or a cellular telephone communication network. The networks NT2, NT3, and NT4 are, for example, the Internet or a cellular telephone communication network.

Figure 5:
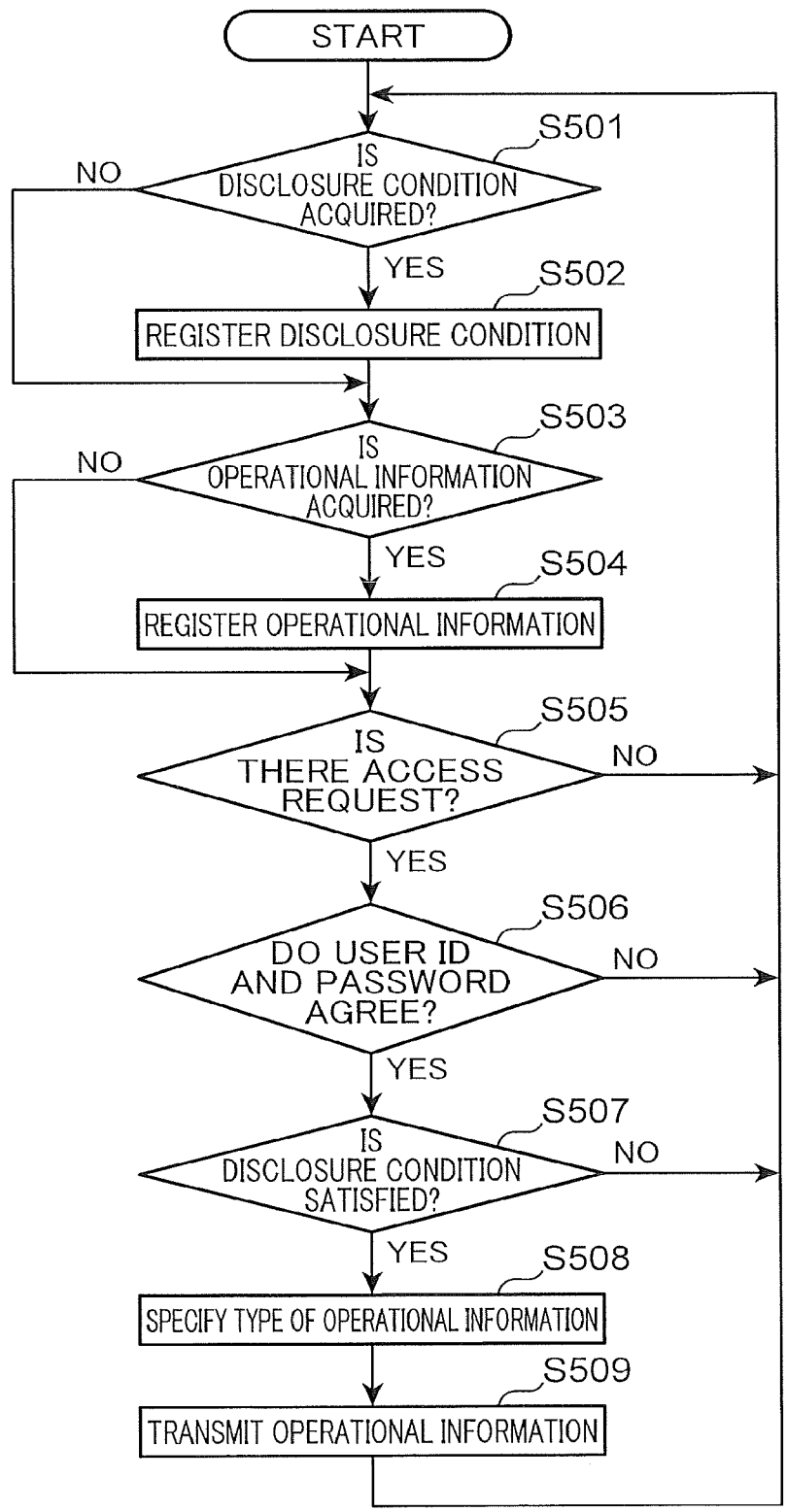
FIG. 5 is a flowchart showing processing of the operation management system according to the embodiment of the present invention.

FIG. 5 is a flowchart showing processing of the operation management system 1 according to the embodiment of the present invention. Note that the flowchart of FIG. 5 is repeatedly executed at regular time intervals.

First, when the first acquisition unit 124 acquires the disclosure condition of each execution manager set by the operation manager from the operation management terminal 13 (YES in S501), the first acquisition unit 124 registers the acquired disclosure condition in the disclosure condition table T1 (S502). On the other hand, when the first acquisition unit 124 does not acquire the disclosure condition (NO in S501), the processing proceeds to S503.

In S503, when the first acquisition unit 124 acquires the operational information from the operational information controller 11 (YES in S503), the first acquisition unit 124 registers the acquired operational information in the operational information table T3 (S504). On the other hand, when the first acquisition unit 124 does not acquire the operational information (NO in S503), the processing proceeds to S505.

Next, when the reception unit 121 receives the access request from the execution information terminal 23 (YES in S505), the reception unit 121 determines whether a pair of the user ID and the password included in the access request agrees with a pair of the user ID and the password registered in the disclosure condition table T1 (S506). In S505, when the reception unit 121 does not receive the access request, the processing returns to S501.

When the pair of the user ID and the password agrees with the pair of the user ID and the password registered in the disclosure condition table T1 (YES in S506), the determination unit 122 determines whether the execution manager who has made the access request satisfies the disclosure condition (S507). In S506, when the pair of the user ID and the password does not agree with the pair of the user ID and the password registered in the disclosure condition table T1 (NO in S506), the processing returns to S501.

When the determination unit 122 determines that the execution manager satisfies the disclosure condition (YES in S507), the permission unit 125 identifies the type of operational information with disclosure permitted to the corresponding execution manager, with reference to the disclosure condition table T1 (S508). In S507, when the execution manager does not satisfy the disclosure condition (NO in S507), the processing returns to S501.

Next, the permission unit 125 transmits, to the execution information terminal 23, the operational information of the type with disclosure permitted, the operational information being regarding the work machine 4 the corresponding execution manager rents (S509). Then, the processing returns to S501.

In this way, in a case where the operation management system 1 receives, from the execution information terminal 23, the access request made by the execution manager to the operation management system, when the execution manager who has made the access request satisfies the corresponding disclosure condition, the operation management system 1 permits disclosure of the operational information to the execution manager. Therefore, on condition that the disclosure condition is satisfied, the operational information can be disclosed to the execution manager.

By acquiring the operational information in addition to the execution information, the execution manager can determine whether the execution work is performed in more detail. For example, by acquiring the positional information, the execution manager can grasp positions of the work machines 4 working in the work site and distribution of the positions. Therefore, when advancing the execution plan, the execution manager can review whether the work machines 4 are arranged efficiently.

Also, by acquiring the fuel efficiency information, the execution manager can grasp fuel consumption information on the work machine 4, optimize refueling timing, and reduce the number of times of refueling. Also, the execution manager can educate the operator of the work machine 4 about energy-saving driving based on the fuel efficiency information.

Also, by acquiring in real time and managing the alarm information in a unified manner, the execution manager can promptly repair the broken-down work machine 4 or arrange an alternative work machine. Also, by acquiring the idling time, the execution manager can grasp work distribution of the work machines 4 in the work site, and review efficient placement of the work machines 4 in the work site.

Meanwhile, when the execution manager does not satisfy the corresponding disclosure condition, the operation management system 1 does not permit disclosure of the operational information to the execution manager. Therefore, the operation management system 1 can disclose only operational information that can be disclosed to the execution manager while ensuring security.

Also, since the operation manager can set the disclosure condition arbitrarily by using the operation management terminal 13, the operation manager can ensure security of the operational information, for example, by increasing the type of operational information to disclose to a reliable execution manager, and decreasing the type of operational information to disclose to an unreliable execution manager.

Also, the operation manager can set the positional condition as the disclosure condition. Therefore, when the work machine 4 is carried out from the work site of the execution manager who has made the access request to another work site because a rental period of the work machine 4 expires, it is possible to prevent disclosure of the operational information to the execution manager. Therefore, the operation management system 1 can prevent leakage of the operational information.

Also, the operation manager can set the period condition as the disclosure condition. Therefore, the operation management system 1 can prevent the operational information from leaking to the execution manager whose use period has expired.

Also, the operation manager, who can set at least one of the positional condition and the period condition as the disclosure condition, can set the disclosure condition level arbitrarily according to the execution manager. Therefore, by setting both the positional condition and the period condition for an unreliable execution manager, the security level can be increased.

CONCLUSION OF EMBODIMENT

One aspect of the present invention is an operation management system for managing one or more types of operational information on a work machine, the operation management system being connected via a network to an information management system that manages information to be provided to one or more execution managers who manage work in a work site of the work machine, the information being different from the operational information, the operation management system including: a storage unit configured to store a disclosure condition of each of the execution managers, the disclosure condition being set by a manager of the operation management system for permitting disclosure of the operational information; a reception unit configured to receive, from a terminal of the information management system, an access request made by the execution manager to the operation management system; a determination unit configured to determine, when the reception unit receives the access request, whether the execution manager who has made the access request satisfies the corresponding disclosure condition; and a permission unit configured to permit the disclosure of the operational information to the execution manager when the determination unit determines that the corresponding disclosure condition is satisfied.

According to this aspect, in a case where the access request made by the execution manager to the operation management system is received from the terminal of the information management system, when the execution manager who has made the access request satisfies the corresponding disclosure condition, disclosure of the operational information to the execution manager is permitted. Therefore, on condition that the disclosure condition is satisfied, the operational information can be disclosed to the execution manager. Meanwhile, when the execution manager does not satisfy the corresponding disclosure condition, disclosure of the operational information to the execution manager is not permitted. Therefore, this aspect can prevent, for example, the operational information from being permanently disclosed to the execution manager whose use period of the work machine has expired, ensuring security.

Also, the manager of the operational information management system, who can arbitrarily set the disclosure condition for each execution manager, can restrict disclosure of the operational information to an unreliable execution manager.

Also, in the above-described aspect, preferably, the operation management system further includes an acquisition unit configured to acquire current positional information on the work machine,
wherein at least one of the disclosure condition is that the acquired positional information is positioned within a working area corresponding to the execution manager who has made the access request.

According to this aspect, when the current position of the work machine is within the work site corresponding to the execution manager who has made the access request, it is determined that the disclosure condition is satisfied. Therefore, when the work machine is carried out from the work site of the execution manager who has made the access request to another work site because the use period of the work machine expires, it is possible to prevent disclosure of the operational information to the execution manager. As a result, leakage of the operational information can be prevented.

Also, in the above-described aspect, preferably, at least one of the disclosure condition is that reception time of the access request is within a use period of the work machine corresponding to the execution manager who has made the access request.

According to this aspect, when the reception time of the access request is within the use period corresponding to the execution manager who has made the access request, it is determined that the disclosure condition is satisfied. Therefore, it is possible to prevent the operational information from leaking to the execution manager whose use period has expired.

Also, in the above-described aspect, preferably, the storage unit stores type information indicating a type of the operational information that is permitted to be disclosed to each of the execution managers, the type information being set by the manager of the operation management system, and when the determination unit determines that the execution manager who has made the access request satisfies the disclosure condition, the determination unit identifies the operational information of the type that is permitted to be disclosed to the execution manager with reference to the type information, and discloses only the identified type of operational information.

According to this aspect, when the execution manager who has made the access request satisfies the disclosure condition, only the operational information of the type that is permitted to be disclosed to the execution manager is disclosed, preventing limitless disclosure of the operational information.

The invention claimed is:

1. An operation management system configured as a computer including a communication device for managing one or more types of operational information on a work machine, the operation management system being connected via a network to an information management system that manages information to be provided to one or more execution managers who manage work in a work site of the work machine, the information being different from the operational information, the operation management system comprising:

processing circuitry configured to
store a disclosure condition of each of the execution managers and an operational information table, the disclosure condition being set by a manager of the operation management system for permitting disclosure of the operational information;
acquire the operational information transmitted from the work machine to store the operational information in the operational information table;
receive, from a terminal of the information management system, an access request made by the execution manager to the operation management system;
determine, when the access request is received, whether the execution manager who has made the access request satisfies the corresponding disclosure condition; and
permit the disclosure of the operational information to the execution manager and transmit to the terminal a type of the operational information that is permitted to be disclosed to the execution manager who has made the access request, when the the corresponding disclosure condition is satisfied,
wherein the processing circuitry is further configured to acquire current positional information on the work machine,
determine that the disclosure condition is satisfied when a position indicated by the current positional information is within a working area corresponding to the execution manager who has made the access request, and
the working area corresponding to the execution manager is an area of the work site in actual space where the execution manager performs execution work by using the work machine rented from the manager.

2. The operation management system according to claim 1, wherein at least one disclosure condition is provided so that reception time of the access request is within a use period of the work machine corresponding to the execution manager who has made the access request.

3. The operation management system according to claim 1, wherein
the processing circuitry stores type information indicating a type of the operational information that is permitted to be disclosed to each of the execution managers, the type information being set by the manager of the operation management system, and
when the processing circuitry determines that the execution manager who has made the access request satisfies the disclosure condition, identifies the operational information of the type that is permitted to be disclosed to the execution manager with reference to the type information, and discloses only the identified type of operational information.

4. A method for disclosing, in an operation management system configured as a computer including a communication device for managing one or more types of operational information of a work machine, the operational information,
the operation management system being connected via a network to an information management system that manages information to be provided to one or more execution managers who manage work in a work site of the work machine, the information being different from the operational information, the operation management system including a storage unit configured to store a disclosure condition of each of the execution managers set by a manager of the operation management system for permitting disclosure of the operational information, and store an operational information table, the method comprising:

acquiring the operational information transmitted from the work machine to store the operational information in the operational information table;

receiving, from a terminal of the information management system, an access request made by the execution manager to the operation management system;

determining, when a reception unit receives the access request, whether the execution manager who has made the access request satisfies the corresponding disclosure condition; and permitting the disclosure of the operational information to the execution manager and transmitting to the terminal a type of the operational information that is permitted to be disclosed to the execution manager who has made the access request, when determining that the disclosure condition is satisfied, wherein the method further includes:

acquiring current positional information on the work machine, determining that the disclosure condition is satisfied when a position indicated by the current positional information is within a working area corresponding to the execution manager who has made the access request, and the working area corresponding to the execution manager is an area of the work site in actual space where the execution manager performs execution work by using the work machine rented from the manager.

\* \* \* \* \*